United States Patent Office 3,433,722
Patented Mar. 18, 1969

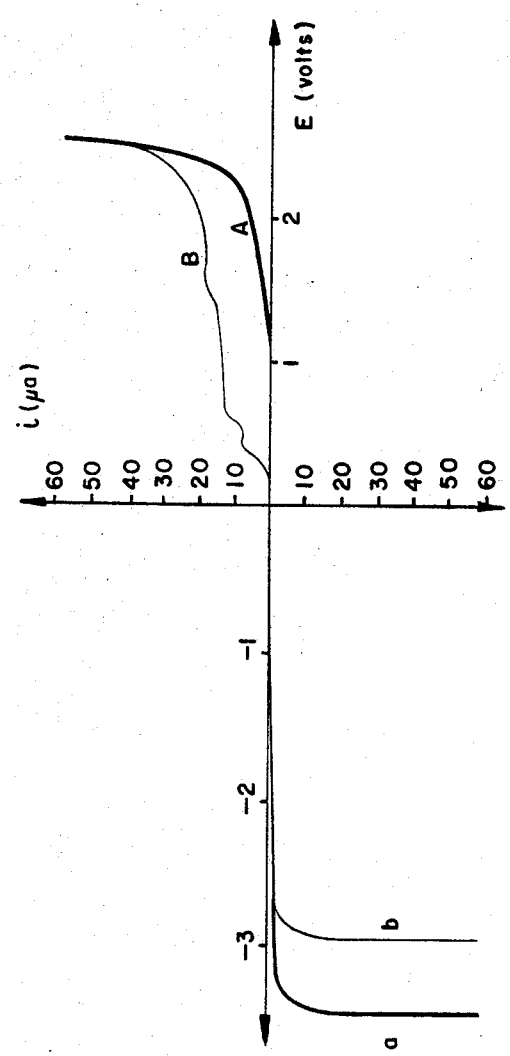

3,433,722
ELECTROLYTIC METHOD OF REMOVING WATER FROM A POLAR SOLVENT
Joseph L. Weininger and Thomas O. Rouse, Schenectady, N.Y., assignors to General Electric Company, a corporation of New York
Filed Oct. 22, 1965, Ser. No. 501,622
U.S. Cl. 204—129
Int. Cl. C01b 1/03, 13/04; B01k 1/00
2 Claims

ABSTRACT OF THE DISCLOSURE

A method for the removal of water from a non-aqueous polar solvent comprises dissolving in the solvent an electrolyte, and imposing on the solution a difference in potential sufficiently great to decompose the water, but not sufficient to decompose the solvent.

---

This invention relates to a method for the drying of non-aqueous polar solvents, and particularly is adapted for removing water from non-aqueous polar solvents when the solvents are to be used in a purified state and the solvents will not be contaminated by a hygroscopic substance.

Non-aqueous solvents usually are contaminated by by-products left from their synthesis and also water. Heretofore these impurities have been removed by the use of fractional distillation processes, or by using certain drying agents, such as sodium, lithium hydride, phosphorus pentoxide, etc., or processes incorporating molecular sieves, or combinations of these processes.

It has also been proposed to use phosphoric acid, sodium hydroxide or potassium hydroxide as a hygroscopic substance to absorb substantially all of the water from non-aqueous fluids. The water is removed from the partially spent absorbent by electrolysis. All of these process are tedious and not satisfactory for the removal of the final traces of water.

It is an object of the present invention to provide a process that will remove the water from a non-aqeuous polar solvent.

It is a further object of this invention to provide a process which will remove the final traces of water from the non-aqueous polar solvent.

It is still a further object of the present invention to remove water from a non-aqueous polar solvent so that that solvent may be used in its purified condition without being contaminated by water derived from a hygroscopic substance.

The various features of novelty are pointed out with particularity in the claims annexed to and forming part of this specification. For a better understanding of the invention, however, its advantages and specific objects obtained with its use, reference should be had to the accompanying descriptive matter in which has been described a preferred embodiment of the invention.

When a non-aqueous solvent contains water, the water may be removed by a process which consists of the following steps:

(1) the addition of an electrolyte to the solvent which will render the solution ionically conducting, and (2) the electrolysis of the resulting solution at a controlled potential, sufficiently great to decompose the water to hydrogen and oxygen.

Certain criteria must be satisfied for the proposed method to operate satisfactorily. That is, the total decomposition potential of the solvent plus the electrolyte must be greater than that of water and the electrolyte, and when the individual cathodic and anodic decomposition reactions must be more difficult, than the corresponding reactions for the water.

As an example of this type of process acetonitrile as ordinarily obtained, contains a certain amount of water. In order to remove water from acetonitrile sufficient lithium perchlorate can be dissolved in the acetonitrile to render it conductive. An electric current may be passed through this solution to remove the water therefrom.

A study has been made by Billon (J. Electroanal. Chem., 1, 486 (1960)) of the anodic and cathodic decomposition reactions of the system, using acetonitrile containing sufficient lithium perchlorate to render the acetonitrile conductive. The addition of water to this system results in both lower anodic and cathodic decomposition potentials, indicating that the reduction of protons to hydrogen is easier than the reduction of lithium ions, and that the oxidation of hydroxyl ions is easier than the oxidation of the solvent.

The addition of 0.01 M sodium perchlorate, as shown in curve A in the figure, has an anodic decomposition potential when water is present of $+2.5$ volts before the acetonitrile reaction will be initiated. 0.01 M tetra-butyl-ammonium-perchlorate containing approximately 0.1 percent water, in shown in curve B and this will have an anodic potential of approximately 2½ volts. The cathodic reaction, curve $a$, shows $-3\frac{1}{4}$ volts for a solution of lithium perchlorate anhydrous. Curve $b$ shows the cathodic reaction potential of lithium perchlorate with approximately 0.2 percent water. All of the electrodes used in the above examples are made of platinum. It has therefore been found possible to dissolve lithium perchlorate in acetonitrile having a small percentage of water therein and applying a potential of 3½ volts thereon, which will decompose the water without the contamination of the acetonitrile solution. It has also been found that the voltage must remain less than 4 volts at which point the decomposition of the solvent will take place. Similarly, tetra-butyl-ammonium-perchlorate and sodium perchlorate acetonitrile solution can be dehydrated by electrolysis using less than 2½ volts, as shown by curves A and B in the figure.

A second example of this process for dehydrating a polar solvent is the use of dimethyl-sulfoxide as a polar solvent using tetra-ethyl-ammonium-perchlorate as a solute, which solution has an anodic limit of $+0.17$ volt, and a cathodic limit of $-1.85$ volts and a polarization range of 2.55 volts (T. B. Reddy, Jour. Electrochem. Society, 108, 980 1961). Water may be removed from this solution with a decomposition potential of about 1.3 volts.

In general, the proposed method will operate satisfactorily when the total decomposition potentials of the polar solvent, plus the electrolyte is greater than that of the electrolyte and water, and when the individual cathodic and anodic decomposition reactions are more difficult than the corresponding reaction for water.

This method for the removal of water from a non-aqueous polar fluid is best suited for use in cases where the presence of the electrolyte is essential during the use of the solvent. This makes this method particularly suitable for the removal of water from solvents to be used for electro-chemical application, that is, the non-aqueous batteries where purification can be accomplished in situ immediately before use.

This method for the removal of water does not have the disadvantage of contaminating the solvent with a hygroscopic substance so as to cause the solvent to absorb water after purification.

The term "polar solvent" as used in this application, refers to the solvents that will form a conducting solution with the proper solute.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What we claim as new and desire to secure by Letters Patent of the United States is:

1. A method for removing water from acetonitrile, which comprises dissolving sufficient lithium perchlorate in the acetonitrile to form a conducting solution, passing an electric current at a voltage not exceeding 3½ volts between two electrodes in the acetonitrile solution.

2. A method of removing water from dimethyl sulfoxide which comprises the steps of dissolving sufficient tetraethyl-ammonium-perchlorate as a solute in the dimethyl sulfoxide to form a conducting solution, passing an electric current at a voltage of about 1.3 volts between the electrodes in said solution to decompose the water.

References Cited

UNITED STATES PATENTS

| | | | |
|---|---|---|---|
| 1,885,393 | 11/1932 | Schaack | 204—130 |
| 2,519,983 | 8/1950 | Simons | 204—59 |
| 2,806,817 | 9/1957 | Wolfe | 204—59 |
| 2,816,067 | 12/1957 | Keidel | 204—130 |
| 2,830,945 | 4/1958 | Keidel | 204—130 |
| 3,062,732 | 11/1962 | Keidel | 204—130 |
| 3,038,853 | 6/1962 | Cole | 204—130 |

JOHN H. MACK, *Primary Examiner.*

H. M. FLOURNOY, *Assistant Examiner.*